United States Patent
Grosjean et al.

(10) Patent No.: US 12,229,355 B2
(45) Date of Patent: Feb. 18, 2025

(54) SENSING DEVICE OF A DISPLACEMENT OF A POINTING DEVICE

(71) Applicant: EM Microelectronic-Marin SA, Marin (CH)

(72) Inventors: Sylvain Grosjean, Les Fins (FR); Jérémy Schlachter, Gampelen (CH)

(73) Assignee: EM Microelectronic-Marin SA, Marin (CH)

( * ) Notice: Subject to any disclaimer, the term of this patent is extended or adjusted under 35 U.S.C. 154(b) by 0 days.

(21) Appl. No.: 18/257,184

(22) PCT Filed: Dec. 14, 2021

(86) PCT No.: PCT/EP2021/085630
§ 371 (c)(1),
(2) Date: Jun. 13, 2023

(87) PCT Pub. No.: WO2022/129007
PCT Pub. Date: Jun. 23, 2022

(65) Prior Publication Data
US 2024/0045521 A1   Feb. 8, 2024

(30) Foreign Application Priority Data
Dec. 14, 2020   (EP) .................................... 20213895

(51) Int. Cl.
*G06F 3/038*    (2013.01)
*G06F 3/0354*   (2013.01)

(52) U.S. Cl.
CPC .......... *G06F 3/038* (2013.01); *G06F 3/03543* (2013.01)

(58) Field of Classification Search
CPC ............................ G06F 3/038; G06F 3/03543
See application file for complete search history.

(56) References Cited

U.S. PATENT DOCUMENTS

| | | | |
|---|---|---|---|
| 8,368,381 B1 * | 2/2013 | Becvar | G06F 3/038 345/207 |
| 2003/0189166 A1 * | 10/2003 | Black | G06F 3/0317 250/221 |
| 2010/0214236 A1 | 8/2010 | Kim | |

FOREIGN PATENT DOCUMENTS

| | | |
|---|---|---|
| EP | 1 772 800 A2 | 4/2007 |
| EP | 1 772 800 A3 | 4/2007 |

OTHER PUBLICATIONS

International Search Report Mar. 17, 2022 in PCT/EP2021/085630 filed on Dec. 14, 2021 2 pages.

* cited by examiner

*Primary Examiner* — Lisa S Landis
(74) *Attorney, Agent, or Firm* — Oblon, McClelland, Maier & Neustadt, L.L.P.

(57) ABSTRACT

In a sensing device of a pointing device, like a mouse, said pointing device includes at least one light source configured to illuminate a surface, at least one first secondary photodetector, at least one second secondary photodetector, and at least one primary photodetector. Each individual storage element of photodetectors is weighted and compared such as to sense a displacement of the pointing device.

13 Claims, 1 Drawing Sheet

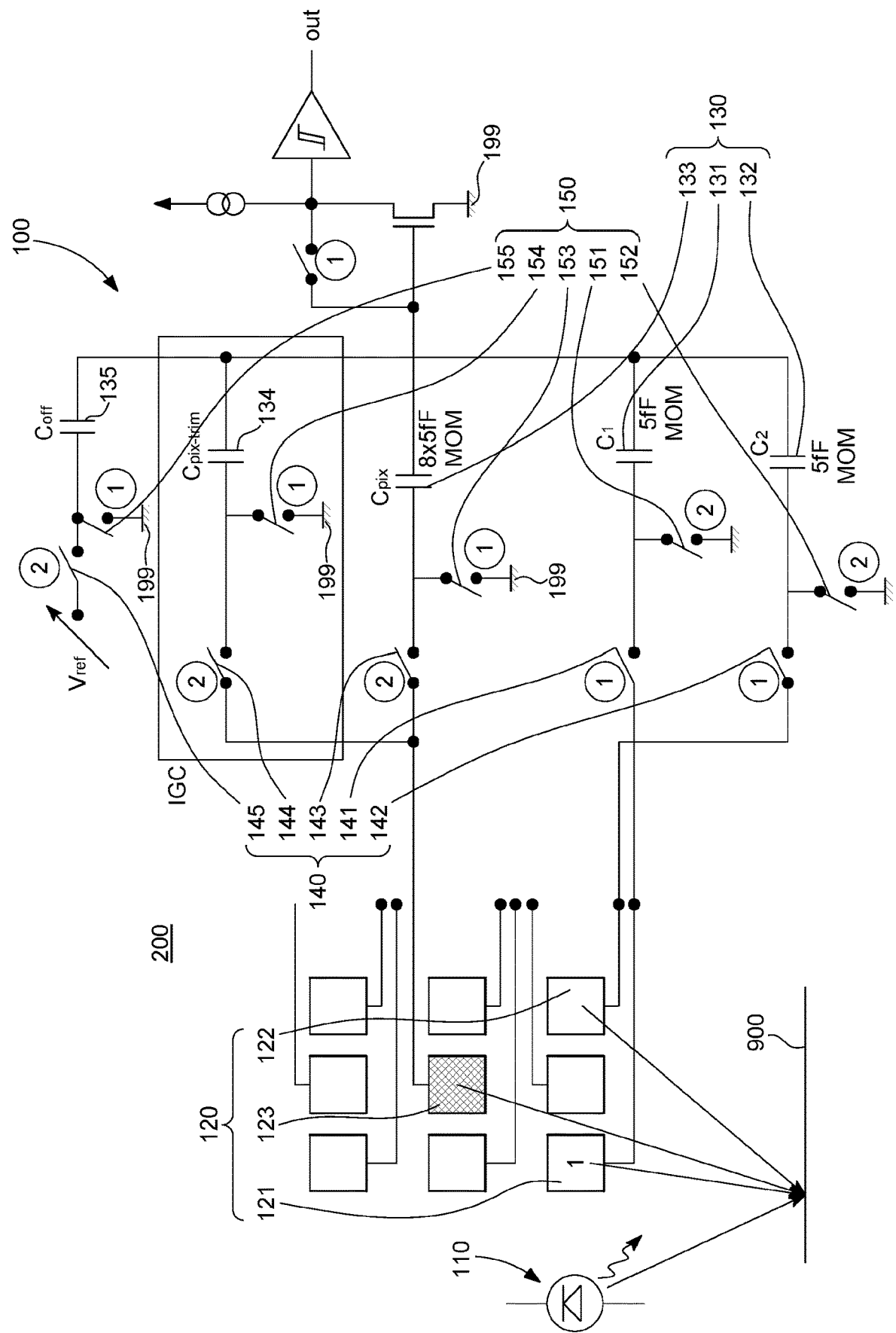

SENSING DEVICE OF A DISPLACEMENT OF A POINTING DEVICE

TECHNICAL FIELD

The present invention generally relates to pointing devices, in particular for controlling the position of a cursor on a screen, such as the display of a personal computer, workstation or other computing devices having a graphic user interface. Such pointing devices may for instance include mice, trackballs and other computer peripherals for controlling the position of a cursor on a display screen.

The present invention more particularly relates to the field of optical pointing devices which comprise an optical motion sensing device including a photodetector array for measuring the varying intensity pattern of a portion of a surface which is illuminated with radiation of a light source and for extracting information about the relative motion between the photodetector array and the illuminated portion of the surface.

STATE OF THE ART

Optical pointing devices incorporating a light source are already known in the art. Such light source allows optical pointing devices such as mice to work on a much wider variety of surfaces. However, the light results in a received image that contains generally high spatial frequencies especially. This high frequency content leads to spatial aliasing due to beyond undersampled (in the spatial domain). This aliasing leads to several bad effects, such as loss of resolution or apparent "reverse" motion (the "wagon-wheel in motion pictures" effect). One alternative to deal with the higher spatial frequency content is to create smaller pixels (higher spatial capability in the imager). But, two major problems arise with smaller pixels that are a lower mouse-speed/acceleration capability and a lower sensitivity to light (less collection area in the pixel).

SUMMARY OF THE INVENTION

The present invention relates to a sensing device of a pointing device; said sensing device comprising at least one light source configured to illuminate a surface, a ground:
  a plurality of photodetector; said plurality of photodetector comprising at least one first secondary photodetector, at least one second secondary photodetector and at least one primary photodetector; and,
  a plurality of storage element; said plurality of storage element comprises at least one first secondary storage element, at least one second secondary storage element and at least one primary storage element;
  characterized in that
  said plurality of photodetector is configured to measure reflected light by said surface and to store said measured reflected light in said plurality of storage element.

Thanks to the arrangement, said sensing device may reveal interesting information when surface local non-uniformity is smaller than the spot gradient and may generate dynamics edges, such as to recognize a moving image and thus improve mouse displacement evaluation.

According to an embodiment, said plurality of storage element comprises a plurality of main switching element and a plurality of auxiliary switching element; said plurality of main switching element is configured to connect said plurality of storage element to said plurality of photodetector and said plurality of auxiliary switching element is configured to connect said plurality of storage element to said ground.

Thanks to this arrangement, said plurality of storage element may be set to ground.

According to an embodiment, said plurality of main switching element comprises at least one first main switching element, at least one second main switching element and at least one third main switching element configured to be connected between said at least one first secondary photodetector, said at least one second secondary photodetector, said at least one primary photodetector, said at least one first secondary storage element, said at least one second secondary storage element and said at least one primary storage element respectively.

Thanks to this arrangement, said plurality of storage element may be connected to said plurality of photodetector.

According to an embodiment, said plurality of auxiliary switching element comprises at least one first auxiliary switching element, at least one second auxiliary switching element and at least one third auxiliary switching element configured to be connected between said at least one first secondary storage element, said at least one second secondary storage element, said at least one primary storage element and said ground respectively.

Thanks to this arrangement, said plurality of storage element may be set to ground.

According to an embodiment, said at least one primary storage element is a multiple of said at least one first secondary storage element and/or said at least one second secondary storage element.

Thanks to one of those embodiments, said method may generate dynamics edges and may remove gradient without calibration or temporal filtering.

BRIEF DESCRIPTION OF THE DRAWINGS

The foregoing and other purposes, features, aspects and advantages of the invention will become apparent from the following detailed description of the embodiments, given by way of illustration and not limitation with reference to the accompanying drawings, in which FIG. 1 illustrates a pointing device 200 with a sensing device 100.

DESCRIPTION OF THE INVENTION

The present invention relates to a pointing device 200 comprising at least one light source 110 configured to illuminate a surface 900 and a plurality of photodetector 120, also called plurality of pixel 120. Said plurality of photodetector 120 may comprise at least one first secondary photodetector 121, at least one second secondary photodetector 122 and at least one primary photodetector 123, more specifically said at least one primary photodetector 123 is comprised between said at least one first secondary photodetector 121, and said at least one second secondary photodetector 122 as depicted in FIG. 1. In others words, said at least one primary photodetector 123 may be surrounded by said at least one first secondary photodetector 121 and said at least one second secondary photodetector 122.

Further, said plurality of pixel 120 may be connected to at least one first secondary storage element 131, at least one second secondary storage element 132 and at least one primary storage element 133. Indeed, said plurality of photodetector 120 may sense reflected light by said surface 900 and said reflected light may be measured such as to be memorized into said at least one first secondary storage element 131, said at least one second secondary storage element 132 and said at least one primary storage element 133. Since said at least one primary photodetector 123 may be surrounded by said at least one first secondary photodetector 121 and said at least one second secondary photodetector 122, said at least one primary storage element 133 may be a multiple of said at least one first secondary storage element 131 and/or said at least one second secondary storage element 132. More specifically, the sum of said plurality of photodetector 120 less said at least one primary photodetector 123 may be served to divided the capacitance of said at least one primary storage element 133 such as to give the capacitances of said at least one first secondary storage element 131 and/or said at least one second secondary storage element 132. For instance, if the number of said plurality of photodetector 120 may be equal to 3, 5 or 9, the sum of said plurality of photodetector 120 less said at least one primary photodetector 123 may be equal to 2, 4 or 8 respectively, and if the capacitance of said at least one primary storage element 133 is equal to 16 for example, the capacitances of said at least one first secondary storage element 131 and/or said at least one second secondary storage element 132 may be equal to 8, 4, or 2 respectively.

Further, said pointing device 200 may reset said plurality of storage element 130 by switching a plurality of main switching element 140 and a plurality of auxiliary switching element 150. As depicted in FIG. 1, said plurality of main switching element is configured to connect said plurality of storage element to said plurality of photodetector 120 and said plurality of auxiliary switching element 150 is configured to connect said plurality of storage element 130 to said ground 199.

More precisely, said plurality of main switching element 140 comprises at least one first main switching element 141, at least one second main switching element 142 and at least one third main switching element 143 configured to be connected between said at least one first secondary photodetector 121, said at least one second secondary photodetector 122, said at least one primary photodetector 123, said at least one first secondary storage element 131, said at least one second secondary storage element 132 and said at least one primary storage element 133 respectively, so that said pointing device 200 may transfer charges from said plurality of photodetector 120 to said plurality of storage element 130.

In order to discharge said plurality of storage element, said at least one first secondary storage element 131, said at least one second secondary storage element 132 and said at least one primary storage element 133 may be connected to said ground 199 via said at least one first auxiliary switching element 151, said at least one second auxiliary switching element 152 and said at least one third auxiliary switching element 153 respectively.

The outcome of the switching of said plurality of main switching element 140 and said plurality of auxiliary switching element 150 is a comparison between said at least one primary storage element 133 and said at least one first secondary storage element 131, and said at least one second secondary storage element 132, so that if the charge of said at least one primary storage element 133 is higher than the charges of said at least one first secondary storage element 131, and said at least one second secondary storage element 132 the result may be positive, and if the charge of said at least one primary storage element 133 is lower than the charges of said at least one first secondary storage element 131, and said at least one second secondary storage element 132 the result may be negative. In case where the charge of said at least one primary storage element 133 is lower than the charges of said at least one first secondary storage element 131, and said at least one second secondary storage element 132 the result may be neutral. According to some aspects of the invention, said plurality of storage elements 130 may comprise at least one first primary storage element 134 configured to adjust the charge of said at least one primary storage element 133, since said at least one first primary storage element 134 may be connected to said at least one primary photodetector 123 via at least one fourth main switching element 144, and at least one second primary storage element 135 configured to set an offset of said at least one primary storage element 133 via at least one fifth main switching element 145 connected to an offset source.

Said at least one first primary storage element 134 and said at least one second primary storage element 135 may be connected to said ground 199 via said at least one fourth auxiliary switching element 154 and said at least one fifth auxiliary switching element 155 and said at least one third auxiliary switching element 153 respectively.

The invention claimed is:

1. A sensing device of a pointing device, comprising:
at least one light source configured to illuminate a surface;
a ground;
a plurality of photodetectors, said plurality of photodetectors comprising at least one first secondary photodetector, at least one second secondary photodetector, and at least one primary photodetector;
a plurality of storage elements, said plurality of storage elements comprising at least one first secondary storage element, at least one second secondary storage element, and at least one primary storage element; and
a plurality of auxiliary switching elements, wherein
said plurality of photodetectors is configured to measure light reflected by said surface and to store said measured reflected light in said plurality of storage elements, and
said plurality of auxiliary switching elements is configured to connect said plurality of storage elements to said ground.

2. The sensing device according to claim 1,
further comprising a plurality of main switching elements, wherein
said plurality of main switching elements is configured to connect said plurality of storage elements to said plurality of photodetectors.

3. The sensing device according to claim 2, wherein said plurality of main switching elements comprises at least one first main switching element, at least one second main switching element and at least one third main switching element configured to be connected between said at least one first secondary photodetector and said at least one first secondary storage element, between said at least one second secondary photodetector and said at least one second secondary storage element, and between said at least one primary photodetector and said at least one primary storage element, respectively.

4. A sensing device of a pointing device comprising:
at least one light source configured to illuminate a surface;
a ground;
a plurality of photodetectors, said plurality of photodetectors comprising at least one first secondary photodetector, at least one second secondary photodetector, and at least one primary photodetector;
a plurality of storage elements, said plurality of storage elements comprising at least one first secondary storage element, at least one second secondary storage element, and at least one primary storage element; and a plurality of auxiliary switching elements, wherein said plurality of photodetectors is configured to measure light reflected by said surface and to store said measured reflected light in said plurality of storage elements, and said plurality of auxiliary switching elements comprises at least one first auxiliary switching element, at least one second auxiliary switching element and at least one third auxiliary switching element configured to be connected between said at least one first secondary storage element, said at least one second secondary storage element, said at least one primary storage element and said ground respectively.

5. A sensing device of a pointing device comprising:

at least one light source configured to illuminate a surface;

a ground;

a plurality of photodetectors, said plurality of photodetectors comprising at least one first secondary photodetector, at least one second secondary photodetector, and at least one primary photodetector; and a plurality of storage elements, said plurality of storage elements comprising at least one first secondary storage element, at least one second secondary storage element, and at least one primary storage element, wherein said plurality of photodetectors is configured to measure light reflected by said surface and to store said measured reflected light in said plurality of storage elements, and a value of a capacitance of said at least one primary storage element is a multiple of a value of a capacitance of said at least one first secondary storage element and/or said at least one second secondary storage element.

6. The sensing device according to claim 4, further comprising a plurality of main switching elements, wherein said plurality of main switching elements is configured to connect said plurality of storage elements to said plurality of photodetectors.

7. The sensing device according to claim 1, wherein the at least one primary photodetector is located between the at least one first secondary photodetector and the at least one second secondary photodetector.

8. The sensing device according to claim 1, wherein the at least one primary photodetector is surrounded by the at least one first secondary photodetector and the at least one second secondary photodetector.

9. The sensing device according to claim 1, wherein the plurality of storage elements further comprises at least one first primary storage element configured to adjust a charge of the at least one primary storage element.

10. The sensing device according to claim 9, wherein the at least one first primary storage element is connected to the at least one primary photodetector via at least one main switching element.

11. The sensing device according to claim 9, wherein the at least one first primary storage element is connected to the ground via at least one fourth auxiliary switching element.

12. The sensing device according to claim 1, wherein the plurality of storage elements further comprises at least one second primary storage element configured to set an offset of the at least one primary storage element via at least one main switching element connected to an offset source.

13. The sensing device according to claim 12, wherein the at least one second primary storage element is connected to the ground via at least one fifth auxiliary switching element.

* * * * *